(12) United States Patent  (10) Patent No.: US 9,092,548 B2
Morsi et al.  (45) Date of Patent: Jul. 28, 2015

(54) TIME-BASED GRAPH DATA MODEL

(71) Applicant: Magnet Systems Inc., Palo Alto, CA (US)

(72) Inventors: Magdi Morsi, San Jose, CA (US); Chih-Po Wen, Redwood City, CA (US); Robyn J. Chan, San Francisco, CA (US); Hanju Kim, Palo Alto, CA (US)

(73) Assignee: Magnet Systems, Inc., Palo Alto, CA (US)

( * ) Notice: Subject to any disclaimer, the term of this patent is extended or adjusted under 35 U.S.C. 154(b) by 319 days.

(21) Appl. No.: 13/838,143

(22) Filed: Mar. 15, 2013

(65) Prior Publication Data

US 2014/0280302 A1 Sep. 18, 2014

(51) Int. Cl.
*G06F 17/30* (2006.01)

(52) U.S. Cl.
CPC .... *G06F 17/30958* (2013.01); *G06F 17/30292* (2013.01); *G06F 17/30964* (2013.01); *Y10S 707/99931* (2013.01)

(58) Field of Classification Search
CPC ................. Y10S 707/99931; G06F 17/30958; G06F 17/30964; G06F 17/30292
See application file for complete search history.

(56) References Cited

U.S. PATENT DOCUMENTS

| 7,870,139 | B2 * | 1/2011 | Cookson et al. | 707/748 |
| 8,250,491 | B2 * | 8/2012 | Holmes | 715/853 |
| 8,655,896 | B2 * | 2/2014 | Rosenberg et al. | 707/755 |
| 2007/0209074 | A1 | 9/2007 | Coffman | |
| 2008/0216094 | A1 | 9/2008 | Anderson et al. | |
| 2008/0294648 | A1 | 11/2008 | Lin et al. | |
| 2010/0174692 | A1 | 7/2010 | Meyer et al. | |
| 2010/0211924 | A1 | 8/2010 | Begel et al. | |
| 2012/0017207 | A1 | 1/2012 | Mahajan et al. | |

FOREIGN PATENT DOCUMENTS

WO   2014/039884 A1   3/2014

OTHER PUBLICATIONS

International Search Report and Written Opinion for PCT Application No. PCT/US2013/058599 mailed Jan. 10, 2014.

* cited by examiner

*Primary Examiner* — Cheryl Lewis
(74) *Attorney, Agent, or Firm* — Kilpatrick Townsend and Stockton LLP (57) ABSTRACT

Systems and processes for accessing data from a graph database are described. The system receives a request comprising time-based information. Time-based information of the request is compared with a first time interval, which is associated with at least one node of a graph. The node of the graph is matched based on the time-based information being at least partially within the first time interval. The system returns a result comprising an indicator of the node of the graph, wherein the node of the graph is associated with an entity, and the node of the graph includes an attribute of the entity.

31 Claims, 5 Drawing Sheets

TIME-BASED GRAPH DATA MODEL

BACKGROUND

1. Field

The present disclosure relates to data storage and retrieval, and, in one particular example, to time-based and relationship-based data storage and retrieval.

2. Related Art

Traditional approaches for managing time-based data use relational database systems. Relational databases often store data using related tables and use primary keys and foreign keys to capture associations. These relational databases provide a sliding window for highly normalized data. Normalization may be used to organize the data into a set of related tables to capture associations. As part of normalization, redundant data may be removed from the database and tables may be optimized to store only related data. As tables in the database grow, the sliding window technique is used to remove the oldest records from tables in the database. These removed records are either archived or deleted.

SUMMARY

Systems and processes for accessing data from a graph database are described. The system receives a request comprising time-based information. Time-based information of the request is compared with a first time interval, which is associated with at least one node of a graph. The node of the graph is matched based on the time-based information being at least partially within the first time interval. The system returns a result comprising an indicator of the node of the graph, wherein the node of the graph is associated with an entity, and the node of the graph includes an attribute of the entity.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

A graph database may be structured to provide efficient storage and retrieval of data. The graph database includes nodes and edges. Each node in the graph database may be assigned an object identity. In one example, the object identity may be unique to the node. In another example, the object identity need not be unique to the node.

The nodes of the graph database are connected through edges. Edges represent a relationship between the nodes that they connect. Edges may include information about a relationship type, a direction, the type of nodes being connected, the number of participants between each source and destination, properties and attributes of the edge type, and the like. The direction information of the edge is based on whether the edge is directed or undirected. For example, a directed edge has a direction of outgoing or incoming, whereas an undirected edge may not have a direction.

A node may be associated with an entity. For example, an entity may be a person, a user, a group, a content, a computing resource, an activity, an event, or the like. A group may be, for example, an organizational unit such as a building, a department, or a company. A content may be, for example, a document, an email, an image, or the like. Thus, the node may represent the entity in the database.

In order to manage and store changes associated with an entity over time, one or more versions of information about the entity may be stored. For example, an entity node may be associated with an employee by the name of "Lisa John." This node may also include information about the employee, such as her legal name, "Lisa John."

Figure 1:
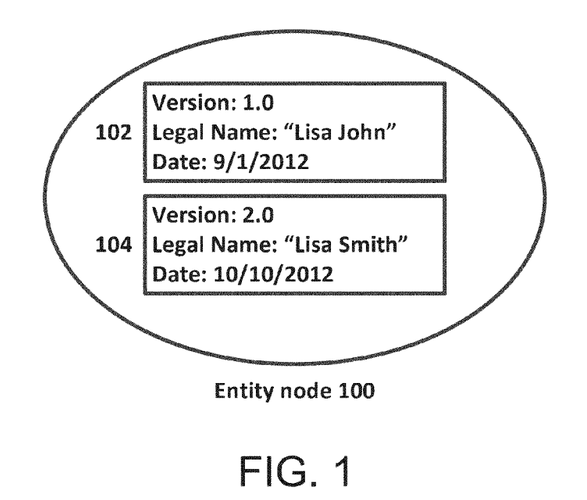
FIG. 1 illustrates capturing a change to the name attribute of an entity.

A node may also be associated with multiple versions of an entity. In one embodiment, illustrated in FIG. 1, a change to the employee's legal name from "Lisa John" to "Lisa Smith" may be captured in the information stored in the entity node 100. In response to detecting the change in the name, the original state information 102 of the employee may remain stored in the entity node 100 and a complete updated state information 104 of the employee may be stored in the node. Each state information for the entity may be associated with a time stamp to identify when the change was made. In another example, the updated state information 104 may include a differential between the original state information 102 and the updated state.

Figure 2:
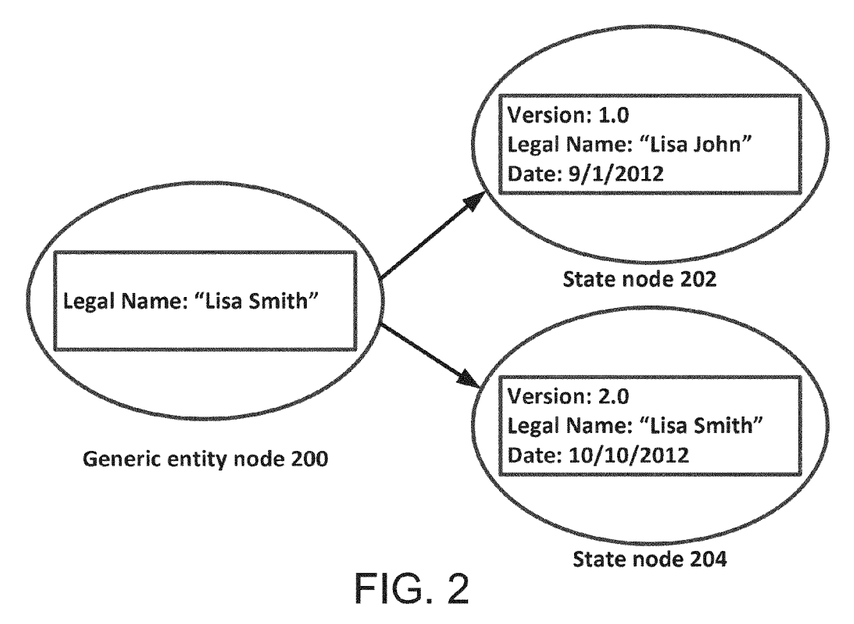
FIG. 2 illustrates capturing a change to the name attribute of an entity.

In another embodiment, illustrated in FIG. 2, a change to an employee's legal name from "Lisa John" to "Lisa Smith" may be captured by adding a node that is connected to generic entity node 200. State node 202 may include the original state information of the employee. The original state information may be associated with a time stamp to identify when the information was added to node 202. State node 204 may include a complete updated state information of the employee. The complete updated state information may be associated with a time stamp to identify when the information was added to node 204. The state nodes 202, 204 may also each have a time interval associated with them that indicates the time during which the state applies. The generic entity node 200 may point to the various possible versions of the state information of the employee. In another example, rather than storing a complete version of the state information of the employee, state node 204 may include a differential between the original state information stored in state node 202 and the updated state.

Figure 3:
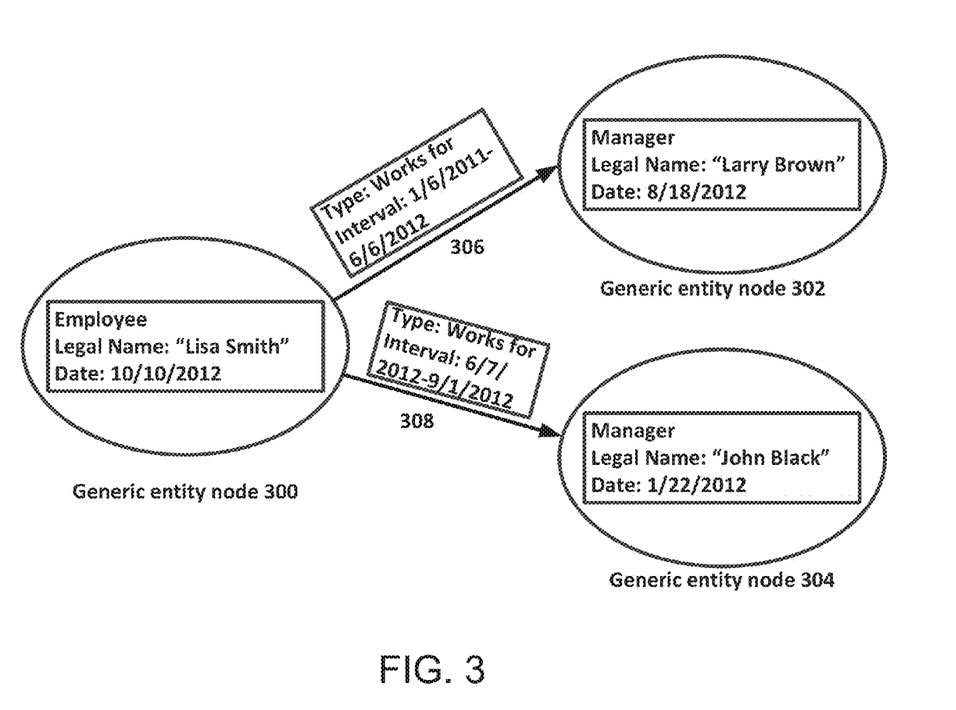
FIG. 3 illustrates a first exemplary embodiment of the relationship among various generic nodes.

FIG. 3 illustrates an exemplary embodiment of the relationship among various generic nodes. Edges may exist among generic nodes, and not among versions of state nodes. In FIG. 3, the generic entity nodes 300, 302, and 304 may include original state information and updated state information. Edge 306 may connect generic entity node 300 and generic entity node 302. Edge 306 may include information indicating that the entity associated with generic entity node 300 works for the entity associated with generic entity node 302. Similarly, edge 308 may connect generic entity node 300 and generic entity node 304. Edge 308 may include information indicating that the entity associated with generic entity node 300 works for the entity associated with generic entity node 304. This information may indicate, for example, that the employee Lisa Smith worked for two different managers during two different intervals. More specifically, that Lisa Smith worked for Larry Brown for the period Jan. 6, 2011-Jun. 6, 2012 and for John Black for the period Jun. 7, 2012-Sep. 1, 2012.

Figure 4:
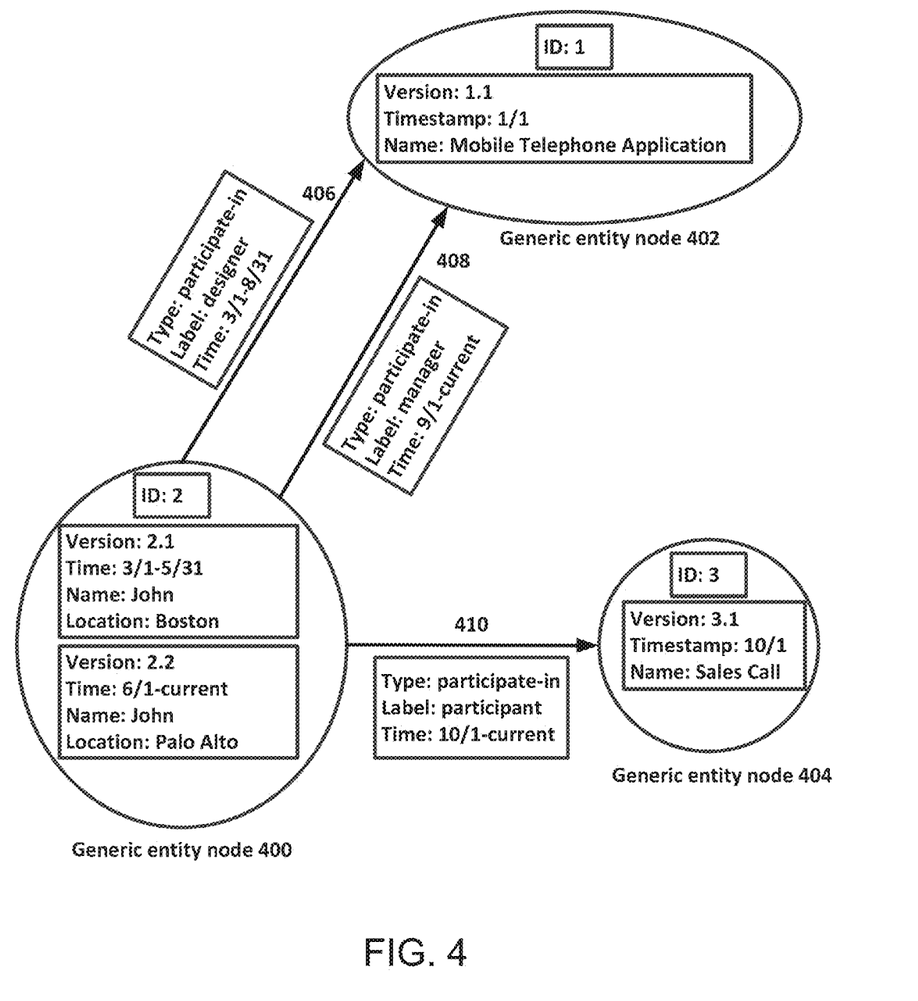
FIG. 4 illustrates a second exemplary embodiment of the relationship among various generic nodes.

FIG. 4 illustrates an exemplary embodiment of the relationship among various generic nodes. Generic entity node 400 includes the original information about an entity, as well as the changes to the information about the entity. In this example, the entity may be a person by the name of John. Generic entity node 400 may include an ID attribute with a value of 2. The ID may be an object identity. This ID attribute value may uniquely identify generic entity node 400. Alternatively, the ID attribute value may not be unique, but may be used to identify generic entity node 400. Generic entity node 400 may include two versions of the state information for the entity represented by the node, storing changes about the entity. The 2.1 version of the state information may indicate that the entity's name is John, the entity is associated with the location of Boston, and that the 2.1 version information is effective during the time duration between the dates of March 1-May 31. The Boston location information may indicate, for example, the city in which John was living, the location of the work office John was assigned to, and the like, for the duration from March 1 through May 31 of the current year. In other examples, the effective time duration may include the day, the month, the year, the hour, minutes, seconds, milliseconds, and the like. One of ordinary skill in the art will readily appreciate that other measurements of time or duration may also be used, such as academic semesters, fiscal quarters, and the like. The 2.2 version of the state information may indicate that the entity's name is John, the entity is associated with the location of Palo Alto, and that the 2.2 version information is effective starting June 1 and continuing until the current day. The Palo Alto location information may indicate, for example, the city in which John was living, the location of the work office John was assigned to, and the like, for the duration starting on June 1 through the current date. Thus, two versions of state information are stored in a node for an entity: a "Boston" version and a "Palo Alto" version. Each version of the state information is associated with the ID attribute value of the node, and each version of the state information includes a time duration during which the version information is effective, or up-to-date.

Generic entity node 402 may represent an entity with the name "Mobile Telephone Application." The entity may be, for example, a software development project. Generic entity node 402 may include an ID attribute value of 1. Version 1.1 of the state information for generic entity node 402 may include a timestamp attribute value of 1/1, indicating that the state information was entered or stored on January 1 of the current year, and a name attribute value of "Mobile Telephone Application."

Edge 406 may connect generic entity node 400 and generic entity node 402. Edge 406 may be a directed edge pointing from generic entity node 400 to generic entity node 402. Edge 406 may include information indicating that the entity associated with generic entity node 400 is a participant in the project associated with generic entity node 402. This information may be represented by the type of the edge, in this case "participate-in." The edge may also include a label attribute value. The label attribute value may indicate, for example, the type of participation. For edge 406, the label attribute value is "designer," indicating that the entity associated with generic entity node 400 was a software development designer with respect to the entity associated with generic entity node 402. In other words, John is a software development designer for the Mobile Telephone Application software development project. However, edge 406 may also have a time attribute value associated with it. The time attribute value may indicate the duration during which the information associated with the edge is applicable. Edge 406 includes time attribute value information of March 1-August 31. This may indicate that John was a software development designer for the Mobile Telephone Application software development project from March 1 to August 31 of the current year.

In addition to edge 406, generic entity node 400 and generic entity node 402 may also be connected by edge 408. Edge 408 may be a directed edge pointing from generic entity node 400 to generic entity node 402. Edge 408 may include information indicating that the entity associated with generic entity node 400 is a participant in the project associated with generic entity node 402. This information may be represented by the type of the edge, in this case "participate-in." The edge may also include a label attribute value. The label attribute value may indicate, for example, the type of participation. For edge 408, the label attribute value is "manager," indicating that the entity associated with generic entity node 400 was a project manager with respect to the entity associated with generic entity node 402. In other words, John is a project manager for the Mobile Telephone Application software development project. However, edge 408 may also have a time attribute value associated with it. The time attribute value may indicate the duration during which the information associated with the edge is applicable. Edge 408 includes time attribute value information of September 1-current. Generic entity node 400, edge 408, and generic entity node 402 indicate that John began his role as the project manager for the Mobile Telephone Application software development project starting on September 1 of the current year, and that he continues to be a participant as the project manager.

Generic entity node 404 may represent an entity with the name "Sales Call." The entity may be, for example, an activity or event that occurred or is scheduled to occur. Generic entity node 404 may include an ID attribute value of 3. This ID attribute value may uniquely identify generic entity node 404 from other nodes in the graph. Version 3.1 of the state information for generic entity node 404 may include a timestamp attribute value of 10/1. This timestamp attribute value may indicate that the "Sales Call" event occurred on October 1 of the current year. Version 3.1 of the state information may also include a name attribute value of "Sales Call."

Edge 410 may connect generic entity node 400 and generic entity node 404. Edge 410 may be a directed edge pointing from generic entity node 400 to generic entity node 404. Edge 410 may include information indicating that the entity associated with generic entity node 400 is a participant in the event associated with generic entity node 404. This information may be represented by the type of the edge, in this case "participate-in." The edge may also include a label attribute value. The label attribute value may indicate, for example, the type of participation. For edge 406, the label attribute value is "participant," indicating that the entity associated with generic entity node 400 was a participant with respect to the entity associated with generic entity node 404. In other words, John was on a sales call that took place on October 1. Edge 410 may also have a time attribute value associated with it. The time attribute value may indicate the duration during which the information associated with the edge is applicable. Edge 410 includes time attribute value information of October 1-current.

Figure 5:
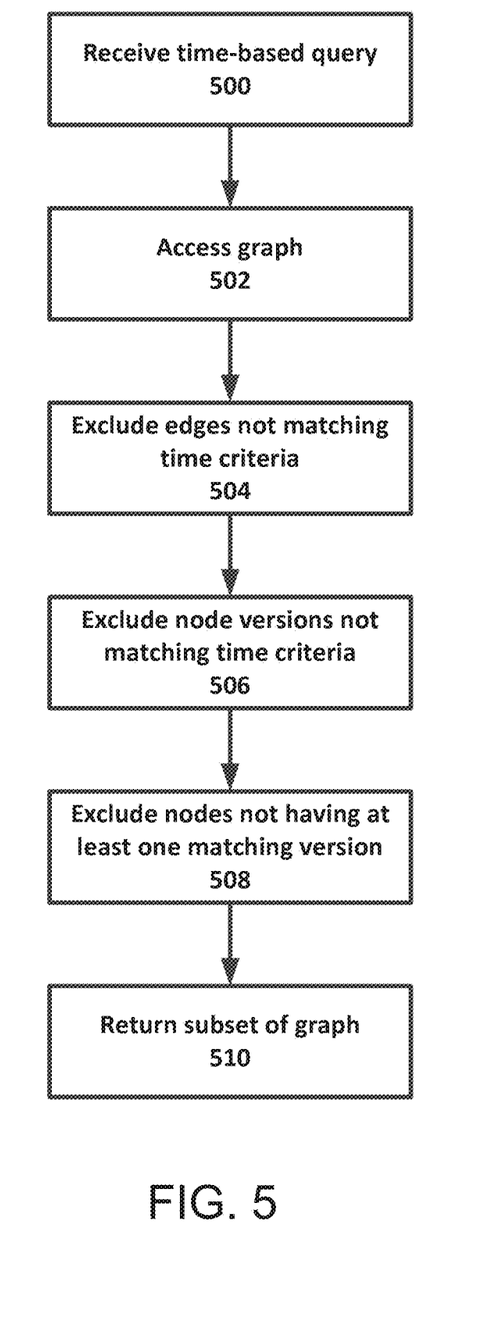
FIG. 5 illustrates an exemplary process for retrieving a portion of a graph based on a time point or a time interval.

FIG. 5 illustrates an exemplary process for retrieving a portion of a graph based on a time point or a time interval. Retrieving a portion of a graph may be useful to determine the state of the graph, an entity, or an entity and related entities, at a certain point in time or during a certain time interval.

At block 500, the system may receive a time-based request. For example, the request may include information requesting the state of an entity or a subset of the graph at a particular point-in-time. In one example, a particular point-in-time may be a specific date, or a specific date and time. For another example, the request may include information requesting the state of an entity or a subset of the graph during a particular duration of time. In one example, a particular duration of time may be a range of dates, a range of times, or a range of dates and times.

At block 502, the system may access all or a portion of the graph. At block 504, the system may exclude all or some edges from an intermediate result based on the time-based request. For example, edges with an associated time interval that does not intersect the point-in-time from the time-based request may be excluded from the intermediate result. For another example, edges with an associated time interval that does not match the duration of time from the time-based request may be excluded from the intermediate result.

At block 506, the system may exclude all or some versions stored in nodes from the intermediate result based on the time-based request. For example, versions of a node that do not intersect a point-in-time from the time-based request or do not match the duration of time from the time-based request may be excluded from the intermediate result.

At block 508, the system may exclude all or some nodes that do not include at least one version of a node that has not been excluded. Thus, any node that has had all versions excluded may also be excluded. At block 510, the system may return a result based on the time-based request. The result may be, for example, a subset of the graph or a characteristic of a node or edge.

Alternatively, rather than excluding edges, nodes, and versions that do not meet the time-based criteria, the system may include edges, nodes, and version that do match the time-based criteria of the request. These edges, nodes, and versions may be included in an intermediate result. For example, the system may include edges that meet the time-based criteria, include node versions that meet the time-based criteria, and include nodes that store at least one node version that has been included for meeting the time-based criteria.

The system may traverse the graph to determine whether edges and nodes meet the time-based criteria of the request. This traversal of the graph may be a loose traversal or a strict traversal. A loose traversal may determine a match when the edges and nodes on the path being traversed at least partially meet the time-based criteria of the request. This may not require that there is a single point in time where each of the matched nodes and edges is valid. For example, if the time-based criteria of the request includes a duration from Jan. 1, 2010 to Jan. 1, 2011, the system may match both an edge that has an interval of Mar. 1, 2010 to Apr. 1, 2010 and an edge that has an interval of Jul. 1, 2010 to Aug. 1, 2010, even though they two edges do not overlap at all.

A strict traversal may determine a match when the edges and nodes on the path being traversed share a single time when they are valid. To determine whether a path is strict, the system may intersect the time window of all the nodes and edges on the path and determine if the results are non-empty.

For example, consider the situation where John and Mary start a friendship on Jan. 1, 2011 and end their friendship on Mar. 1, 2011. Mary and Larry later start a friendship on May 1, 2011. A loose traversal may indicate that Larry is part of John's extended (second degree) friend network in 2011. A strict traversal may indicate that Larry is not part of John's extended friend network in 2011 because they did not share at least a single point in time for a match.

Some information in the graph may be classified as data that changes slowly, rather than changing on a time-based, regular schedule. For example, the data may never change, change infrequently, or be less likely to change than the data in the graph on average, or change once or less per a specified time period (such as once or less per year, or month, or day). For example, birthdates, a work location, place of birth, social security number, or item color may be slow changing. For this type of data, techniques related to slow changing dimensions may be used. By identifying data in the graph as slow changing, searching and matching may be performed more efficiently.

Slow changing data fields in the graph may be classified as one of three types. Type 0 data may be data fields that are not changed once the value of the data field is set or stored. Type 1 data may be data fields where more recent data overwrites the previous data, or more recent data takes precedence over less recent data. Using this information, queries may be constrained based on slow changing dimension types. Type 2 data may be data where a time window is consistent with the traverse path.

One example of a query related to type 0 data may be querying to find all employees who first worked for the company in California. The first version of the data may be accessed to return a result to this query. One example of a query related to type 1 data may be querying to find the current email addresses of all employees who worked on a particular project. In this example, the most recent (and therefore the most likely to be valid) email information should be retrieved. One example of a query related to type 2 data may be querying to find all employees who worked on a project in California at a certain point in time.

A basic set of queries to return edges, nodes, and attributes may be implemented. Some examples are provided below. These examples of basic queries need not be implemented verbatim as a query language, but may be abstract forms for queries instead. In interpreting the basic queries, it may be useful to note that the portion preceding the colon divider describes an input portion and the portion following the colon divider describes an output portion. Generally, G represents graph, N represents node, E represents edge, F represents function, T represents time interval, B represents boolean, and V represents version.

The basic set of queries may include:

| Query Example | Data Model Meaning | Example Usage |
|---|---|---|
| outEdges(N): List<P> | Return the list of edges emanating from the node N as paths stored in P. | Retrieve the outgoing edges. |
| inEdges(N): List<P> | Return the list of edges incoming to node N as paths stored in P. | Retrieve the incoming edges. |
| nodes(P):List<N> | Given the nodes in path P, return the sequence of nodes in N as a list. | |
| edgeProperties(E):Map<String,V> | Return the properties of the edge E in String and V. | Apply a constraint inside another function. |
| nodeAttributes(N):List<Map<String,V>> | Return the attribute-values for all the versions of the node N in String and V as a list. | Implement the various types of slowly changing dimension semantics. |

An extended set of queries to return edges, nodes, and attributes may also be implemented. Again, these examples of queries need not be implemented verbatim as a query language, but may be abstract forms for queries instead. In a follow function, a query is a traversal that begins at a particular node and ends at another particular node. Some examples are provided below.

Figure 6:
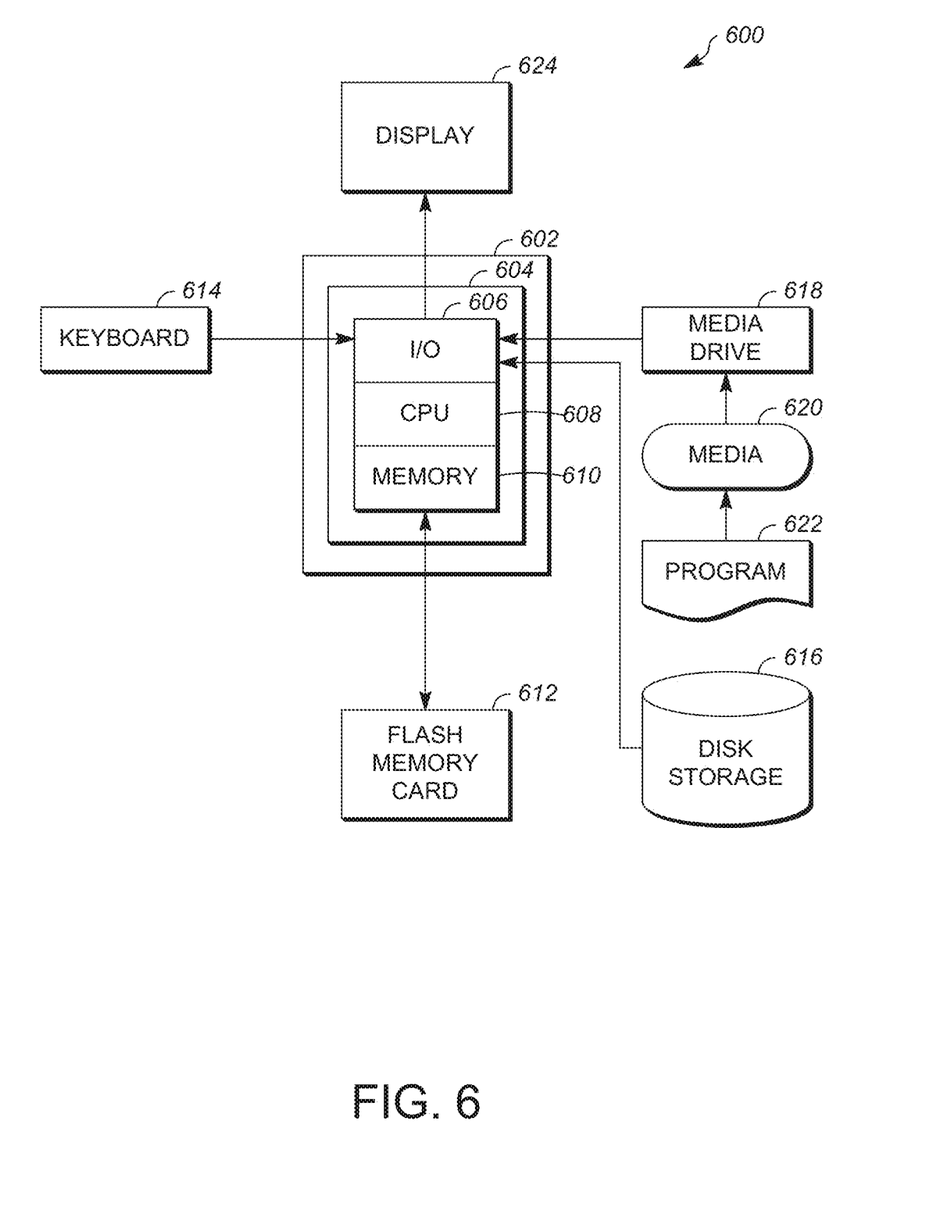
FIG. 6 depicts an exemplary computing system.

FIG. 6 depicts an exemplary computing system 600 configured to perform any one of the above-described processes. In this context, computing system 600 may include, for example, a processor, memory, storage, and input/output devices (e.g., monitor, keyboard, disk drive, Internet connection, etc.). However, computing system 600 may include circuitry or other specialized hardware for carrying out some or

| Traversal Operators | | |
|---|---|---|
| Query Example | Data Model Meaning | Example Usage |
| find(G, F(N):B): List<N> | Return the list of nodes that meet the constraint set by the Boolean function F. | Find all employees who lived in California last year. |
| find(G, F(E):B):List<E> | Return the list of edges that meet the constraint set by the Boolean function F. | Find all friendships since in this model a friendship is represented by an edge. |
| follow(G, List<N>, List<F(N):B>, List<F(E,B):B>) : List<P> | Starting with the given node, traverse the edges and return the list of qualified paths. The first list of functions constrains the nodes and the second list constrains the edges. The edge constraint function takes two inputs: the first is the edge and the second is a Boolean value that indicates whether the edge is an out-going edge. | Find my male friends' female friends. In this case, the starting node list is a singleton (self), the list of edge functions are the function label(E) == 'friend' repeated twice, and the list of node functions are male(N) followed by female(N). |
| follow<G, List<P>, List<F(G, List<P>):List<P>>>:List<P> | Compose a series of follow functions. The follow function that takes a list of follow functions and traverses them in sequence. | Find my friend's co-workers (where "my friends" would be a follow function input). |
| subgraph(G, T, F(N):B, F(E):B):G | Return the sub-graph where the nodes and edges are valid for the time interval T and satisfy the given constraint functions. | Restrict the report to the sales activities for the current month. | all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform the above-described processes. The main system 602 includes a motherboard 604 having an input/output ("I/O") section 606, one or more central processing units ("CPU") 608, and a memory section 610, which may have a flash memory card 612 related to it. The I/O section 606 is connected to a display 624, a keyboard 614, a disk storage unit 616, and a media drive unit 618. The media drive unit 618 can read/write a computer-readable medium 620, which can contain programs 622 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

What is claimed is:

1. A computer-implemented method for accessing data from a database, the method comprising:
   receiving a request, the request comprising time-based information and relationship information;
   comparing the time-based information of the request with a first time interval, the first time interval associated with at least one node of a graph, wherein the at least one node is associated with an entity, and the at least one node includes an attribute of the entity;
   matching the at least one node of the graph, the matching of the at least one node based on the time-based information being at least partially within the first time interval;
   returning a result, the result comprising a first indicator of the at least one node;
   comparing the relationship information of the request with a relationship status, the relationship status associated with at least one edge of the graph; and
   matching the at least one edge of the graph, the matching of the at least one edge based on the relationship information matching the relationship status, wherein the result further comprises a second indicator of the at least one edge, and the at least one edge connects the at least one node to a second node.

2. The computer-implemented method of claim 1, the method comprising:
   comparing the time-based information of the request with a second time interval, the second time interval associated with at least one edge of the graph;
   matching the at least one edge of the graph, the matching of the at least one edge based on the time-based information being at least partially within the second time interval; and
   wherein the result further comprises a second indicator of the at least one edge, and the at least one edge connects the at least one node to a second node.

3. The computer-implemented method of claim 2, wherein:
   the matching of the at least one node of the graph and the at least one edge of the graph are on a path with a strict match; and
   the strict match requiring that edges and nodes on the path share a single valid time, the single valid time determined by identifying a single point-in-time falling within time intervals associated with each edge of the path and each node of the path.

4. The computer-implemented method of claim 3, further comprising:
   accessing the at least one node based on an object identity value; and
   wherein the object identity value is unique to the node, as compared to other nodes in the graph.

5. The computer-implemented method of claim 1, wherein:
   the entity representation is selected from the group comprising a user, a content, an activity, and an event.

6. The computer-implemented method of claim 1, further comprising:
   accessing a first version information of the entity associated with the at least one node;
   accessing a second version information of the entity associated with the at least one node;
   selecting one of the first version information and the second version information; and
   wherein the selected version information is selected based on the time-based information, and wherein the result further indicates the selected version information.

7. The computer-implemented method of claim 6, wherein:
   the first version information includes a first complete state information of the entity associated with the at least one node;
   the second version information includes a second complete state information of the entity associated with the at least one node; and
   the first version information is not the same as the second version information.

8. The computer-implemented method of claim 6, wherein:
   the first version information includes a complete state information of the entity associated with the at least one node; and
   the second version information includes a differential state information of the entity associated with the at least one node, based on the complete state information.

9. The computer-implemented method of claim 1, wherein:
   the at least one edge comprises a label attribute value, the label attribute value indicating a type of participation between entities of two nodes connected by the at least one edge.

10. The computer-implemented method of claim 1, wherein:
    the time-based information comprises a particular point-in-time or a particular duration of time.

11. A non-transitory computer-readable storage medium comprising computer-executable instructions which when executed by a processor, cause the processor to:

receive a request, the request comprising time-based information and relationship information;

compare the time-based information of the request with a first time interval, the first time interval associated with at least one node of a graph, wherein the at least one node is associated with an entity, and the at least one node includes an attribute of the entity;

match the at least one node of the graph, the matching of the at least one node based on the time-based information being at least partially within the first time interval;

return a result, the result comprising a first indicator of the at least one node;

compare the relationship information of the request with a relationship status, the relationship status associated with at least one edge of the graph; and match the at least one edge of the graph based on the relationship information matching the relationship status, wherein the result further comprises a second indicator of the at least one edge, and the at least one edge connects the at least one node to a second node.

12. The non-transitory computer-readable storage medium of claim 11, the method comprising:

comparing the time-based information of the request with a second time interval, the second time interval associated with at least one edge of the graph;

matching the at least one edge of the graph, the matching of the at least one edge based on the time-based information being at least partially within the second time interval; and wherein the result further comprises a second indicator of the at least one edge, and the at least one edge connects the at least one node to a second node.

13. The non-transitory computer-readable storage medium of claim 12, wherein:

the matching of the at least one node of the graph and the at least one edge of the graph are on a path with a strict match; and the strict match requiring that edges and nodes on the path share a single valid time, the single valid time determined by identifying a single point-in-time falling within time intervals associated with each edge of the path and each node of the path.

14. The non-transitory computer-readable storage medium of claim 13, further comprising:

accessing the at least one node based on an object identity value; and wherein the object identity value is unique to the node, as compared to other nodes in the graph.

15. The non-transitory computer-readable storage medium of claim 11, wherein:

the entity representation is selected from the group comprising a user, a content, an activity, and an event.

16. The non-transitory computer-readable storage medium of claim 11, further comprising:

accessing a first version information of the entity associated with the at least one node;

accessing a second version information of the entity associated with the at least one node;

selecting one of the first version information and the second version information; and wherein the selected version information is selected based on the time-based information, and wherein the result further indicates the selected version information.

17. The non-transitory computer-readable storage medium of claim 16, wherein:

the first version information includes a first complete state information of the entity associated with the at least one node;

the second version information includes a second complete state information of the entity associated with the at least one node; and the first version information is not the same as the second version information.

18. The non-transitory computer-readable storage medium of claim 16, wherein:

the first version information includes a complete state information of the entity associated with the at least one node; and the second version information includes a differential state information of the entity associated with the at least one node, based on the complete state information.

19. The non-transitory computer-readable storage medium of claim 11, wherein:

the at least one edge comprises a label attribute value, the label attribute value indicating a type of participation between entities of two nodes connected by the at least one edge.

20. The non-transitory computer-readable storage medium of claim 11, wherein:

the time-based information comprises a particular point-in-time or a particular duration of time.

21. An apparatus for accessing data from a database, the apparatus comprising:

a memory configured to store data; and a computer processor configured to:

receive a request, the request comprising time-based information and relationship information;

compare the time-based information of the request with a first time interval, the first time interval associated with at least one node of a graph, wherein the at least one node is associated with an entity, and the at least one node includes an attribute of the entity;

match the at least one node of the graph based on the time-based information being at least partially within the first time interval;

return a result, the result comprising a first indicator of the at least one node;

access a relationship information;

compare the relationship information of the request with a relationship status, the relationship status associated with at least one edge of the graph; and match the at least one edge of the graph, the matching of the at least one edge based on the relationship information matching the relationship status, wherein the result further comprises a second indicator of the at least one edge, and the at least one edge connects the at least one node to a second node.

22. The apparatus of claim 21, the computer processor further configured to:

compare the time-based information of the request with a second time interval, the second time interval associated with at least one edge of the graph;

match the at least one edge of the graph, the matching of the at least one edge based on the time-based information being at least partially within the second time interval; and wherein the result further comprises a second indicator of the at least one edge, and the at least one edge connects the at least one node to a second node.

23. The apparatus of claim 22, wherein:
the matching of the at least one node of the graph and the at least one edge of the graph are on a path with a strict match; and
the strict match requiring that edges and nodes on the path share a single valid time, the single valid time determined by identifying a single point-in-time falling within time intervals associated with each edge of the path and each node of the path.

24. The apparatus of claim 23, the computer processor further configured to:
access the at least one node based on an object identity value; and
wherein the object identity value is unique to the node, as compared to other nodes in the graph.

25. The apparatus of claim 21, wherein:
the entity representation is selected from the group comprising a user, a content, an activity, and an event.

26. The apparatus of claim 21, the computer processor further configured to:
access a first version information of the entity associated with the at least one node;
access a second version information of the entity associated with the at least one node;
select one of the first version information and the second version information; and
wherein the selected version information is selected based on the time-based information, and wherein the result further indicates the selected version information.

27. The apparatus of claim 26, wherein:
the first version information includes a first complete state information of the entity associated with the at least one node;
the second version information includes a second complete state information of the entity associated with the at least one node; and
the first version information is not the same as the second version information.

28. The apparatus of claim 26, wherein:
the first version information includes a complete state information of the entity associated with the at least one node; and
the second version information includes a differential state information of the entity associated with the at least one node, based on the complete state information.

29. The apparatus of claim 21, wherein:
the at least one edge comprises a label attribute value, the label attribute value indicating a type of participation between entities of two nodes connected by the at least one edge.

30. The apparatus of claim 21, wherein:
the time-based information comprises a particular point-in-time or a particular duration of time.

31. A non-transitory computer-readable storage medium comprising computer-executable instructions for accessing data from a database, the instructions when executed by a processor causing the processor to:
receive a request, the request comprising a node constraint value and an edge constraint value;
traverse at least a portion of a graph of the graph database, the traversal being in response to receiving the request;
determine a first match of a first node of the graph, the first match based on the node constraint;
determine a second match of a second node of the graph, the second match based on the edge constraint;
return a result, the result comprising a first indicator of the first node and a second indicator of the second node;
wherein the first node is associated with a first entity, the first node includes an attribute of the first entity, and the first node comprises a first version information of the first entity and a second version information of the first entity; and
wherein the second node is associated with a second entity, the second node includes an attribute of the second entity, and the second node comprises a third version information of the second entity and a fourth version information of second the entity.

* * * * *